US010334662B2

(12) United States Patent
Chen et al.

(10) Patent No.: US 10,334,662 B2
(45) Date of Patent: Jun. 25, 2019

(54) ENHANCED ANTENNA MANAGEMENT BY A BASE STATION

(71) Applicant: QUALCOMM Incorporated, San Diego, CA (US)

(72) Inventors: Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/216,203

(22) Filed: Mar. 17, 2014

(65) Prior Publication Data

US 2014/0307820 A1 Oct. 16, 2014

Related U.S. Application Data

(60) Provisional application No. 61/812,644, filed on Apr. 16, 2013.

(51) Int. Cl.
*H04W 88/08* (2009.01)
*H04W 52/02* (2009.01)
*H04B 7/06* (2006.01)

(52) U.S. Cl.
CPC .............. *H04W 88/08* (2013.01); *H04B 7/06* (2013.01); *H04B 7/0691* (2013.01); *H04W 52/0206* (2013.01); *H04W 52/0209* (2013.01); *H04W 52/0216* (2013.01); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/444* (2018.01)

(58) Field of Classification Search
CPC ..... H04L 5/0053; H04L 5/001; H04L 1/0026; H04L 5/0057; H04W 72/042; H04W 72/0453
USPC ........ 375/260, 267; 370/252, 311, 328, 329, 370/335
See application file for complete search history.

(56) References Cited

U.S. PATENT DOCUMENTS

| | | |
|---|---|---|
| 8,483,172 B1 | 7/2013 | Dinan |
| 2010/0130219 A1 | 5/2010 | Cave et al. |
| 2010/0246561 A1 | 9/2010 | Shin et al. |
| 2011/0002281 A1 | 1/2011 | Terry et al. |

(Continued)

FOREIGN PATENT DOCUMENTS

| | | |
|---|---|---|
| WO | WO-2010078365 A1 | 7/2010 |
| WO | WO-2012151143 A1 | 11/2012 |

(Continued)

OTHER PUBLICATIONS

International Search Report and Written Opinion—PCT/US2014/031008—ISA/EPO—dated Aug. 28, 2014.

*Primary Examiner* — Patrick Edouard
*Assistant Examiner* — Eboni Hughes
(74) *Attorney, Agent, or Firm* — Norton Rose Fulbright US LLP

(57) ABSTRACT

Enhanced antenna management for nodes is described in which transmit antennas assigned to at least one first carrier are designated for usage in a second carrier. The nodes transmit various signals and reference signals using a set of antenna ports on the second carrier based on the combined physical antennas associated with the first inactive carriers and physical antennas associated with the second carrier.

28 Claims, 7 Drawing Sheets

(56) References Cited

U.S. PATENT DOCUMENTS

| | | |
|---|---|---|
| 2011/0194551 A1 | 8/2011 | Lee et al. |
| 2012/0039229 A1 | 2/2012 | Etemad et al. |
| 2012/0100863 A1 | 4/2012 | Klatt et al. |
| 2012/0176939 A1 | 7/2012 | Qu et al. |
| 2012/0213154 A1 | 8/2012 | Gaal et al. |
| 2012/0213261 A1 | 8/2012 | Sayana et al. |
| 2012/0257588 A1 | 10/2012 | Umeda et al. |
| 2013/0010620 A1 | 1/2013 | Dinan |
| 2013/0170376 A1* | 7/2013 | Dinan .................. H04W 72/12 370/252 |
| 2013/0294369 A1* | 11/2013 | Dinan .................... H04L 5/001 370/329 |
| 2014/0169317 A1* | 6/2014 | Gao .................... H04B 7/0404 370/329 |
| 2015/0208269 A1* | 7/2015 | Damnjanovic ....... H04L 1/0026 370/252 |
| 2015/0215929 A1* | 7/2015 | Damnjanovic ......... H04L 5/001 370/241 |
| 2016/0057684 A1* | 2/2016 | Larsson ............... H04W 36/26 370/331 |

FOREIGN PATENT DOCUMENTS

| | | |
|---|---|---|
| WO | WO 2013013376 A1 * | 1/2013 |
| WO | WO-2013013376 A1 | 1/2013 |

* cited by examiner

ENHANCED ANTENNA MANAGEMENT BY A BASE STATION

CROSS-REFERENCE TO RELATED APPLICATIONS

This application claims the benefit of U.S. Provisional Patent Application No. 61/812,644, entitled, ENHANCED ANTENNA MANAGEMENT BY A BASE STATION", filed on Apr. 16, 2013, which is expressly incorporated by reference herein in its entirety.

BACKGROUND

Field

Aspects of the present disclosure relate generally to wireless communication systems, and more particularly, to enhanced antenna management by a base station.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes designating, by a node, one or more transmit antennas of the node assigned to at least one first carrier for usage in a second carrier and transmitting at least one of a control channel, a data channel, or a reference signal with a set of antenna ports on the second carrier, wherein the set of antenna ports are based, at least in part, on a combination of the one or more transmit antennas assigned to the at least one first carrier and one or more transmit antennas of the node assigned to the second carrier.

In an additional aspect of the disclosure, a method of wireless communication includes receiving, at a mobile device, a reference signal on a carrier of a cell and a configuration of a first set of antenna ports and a second set of antenna ports, receiving an indication of one of the first set of antenna ports or the second set of antenna ports for the reference signal for a subframe, and processing the reference signal according to the configuration based on the indicated set of antenna ports for the reference signal in the subframe.

In an additional aspect of the disclosure, an apparatus configured for wireless communication includes means for designating, by a node, one or more transmit antennas of the node assigned to at least one first carrier for usage in a second carrier and means for transmitting at least one of a control channel, a data channel, or a reference signal with a set of antenna ports on the second carrier, wherein the set of antenna ports are based, at least in part, on a combination of the one or more transmit antennas assigned to the at least one first carrier and one or more transmit antennas of the node assigned to the second carrier.

In an additional aspect of the disclosure, an apparatus configured for wireless communication that includes means for receiving, at a mobile device, a reference signal on a carrier of a cell and a configuration of a first set of antenna ports and a second set of antenna ports, means for receiving an indication of one of the first set of antenna ports or the second set of antenna ports for the reference signal for a subframe, and means for processing the reference signal according to the configuration based on the indicated set of antenna ports for the reference signal in the subframe.

In an additional aspect of the disclosure, a computer program product has a computer-readable medium having program code recorded thereon. This program code includes code for causing a computer to designate, by a node, one or more transmit antennas of the node assigned to at least one first carrier for usage in a second carrier and code for causing the computer to transmit at least one of a control channel, a data channel, or a reference signal with a set of antenna ports on the second carrier, wherein the set of antenna ports are based, at least in part, on a combination of the one or more transmit antennas assigned to the at least one first carrier and one or more transmit antennas of the node assigned to the second carrier.

In an additional aspect of the disclosure, a computer program product has a computer-readable medium having program code recorded thereon. This program code includes code for causing a computer to receive, at a mobile device, a reference signal on a carrier of a cell and a configuration of a first set of antenna ports and a second set of antenna ports, code for causing the computer to receive an indication of one of the first set of antenna ports or the second set of antenna ports for the reference signal for a subframe, and code for causing the computer to process the reference signal according to the configuration based on the indicated set of antenna ports for the reference signal in the subframe.

In an additional aspect of the disclosure, an apparatus includes at least one processor and a memory coupled to the processor. The processor is configured to designate, by a node, one or more transmit antennas of the node assigned to at least one first carrier for usage in a second carrier and to transmit at least one of a control channel, a data channel, or a reference signal with a set of antenna ports on the second carrier, wherein the set of antenna ports are based, at least in part, on a combination of the one or more transmit antennas assigned to the at least one first carrier and one or more transmit antennas of the node assigned to the second carrier.

In an additional aspect of the disclosure, an apparatus includes at least one processor and a memory coupled to the processor. The processor is configured to receive, at a mobile device, a reference signal on a carrier of a cell and a configuration of a first set of antenna ports and a second set of antenna ports, to receive an indication of one of the first set of antenna ports or the second set of antenna ports for the reference signal for a subframe, and to process the reference signal according to the configuration based on the indicated set of antenna ports for the reference signal in the subframe.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
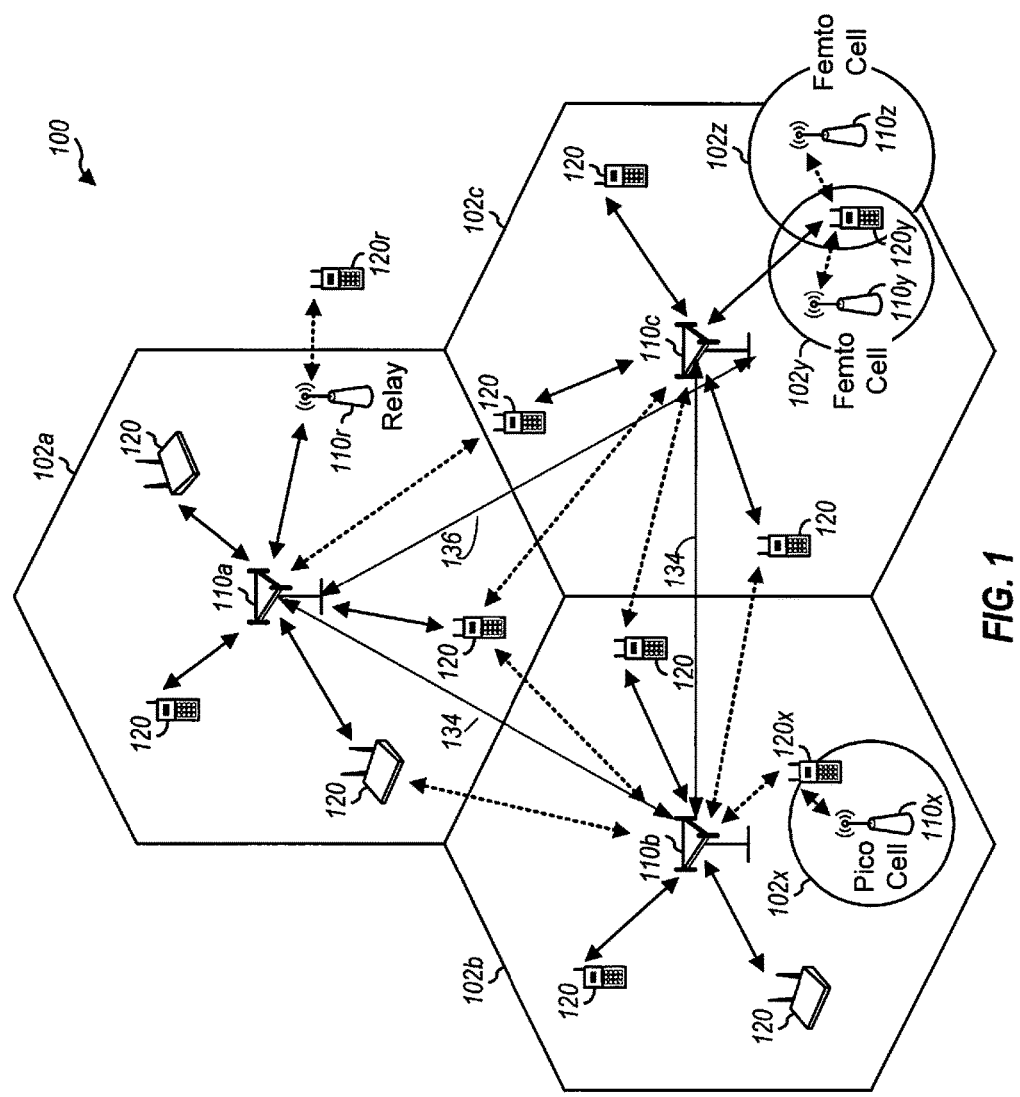
FIG. 1 is a block diagram illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110*a*, 110*b* and 110*c* are macro eNBs for the macro cells 102*a*, 102*b* and 102*c*, respectively. The eNB 110*x* is a pico eNB for a pico cell 102*x*. And, the eNBs 110*y* and 110*z* are femto eNBs for the femto cells 102*y* and 102*z*, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
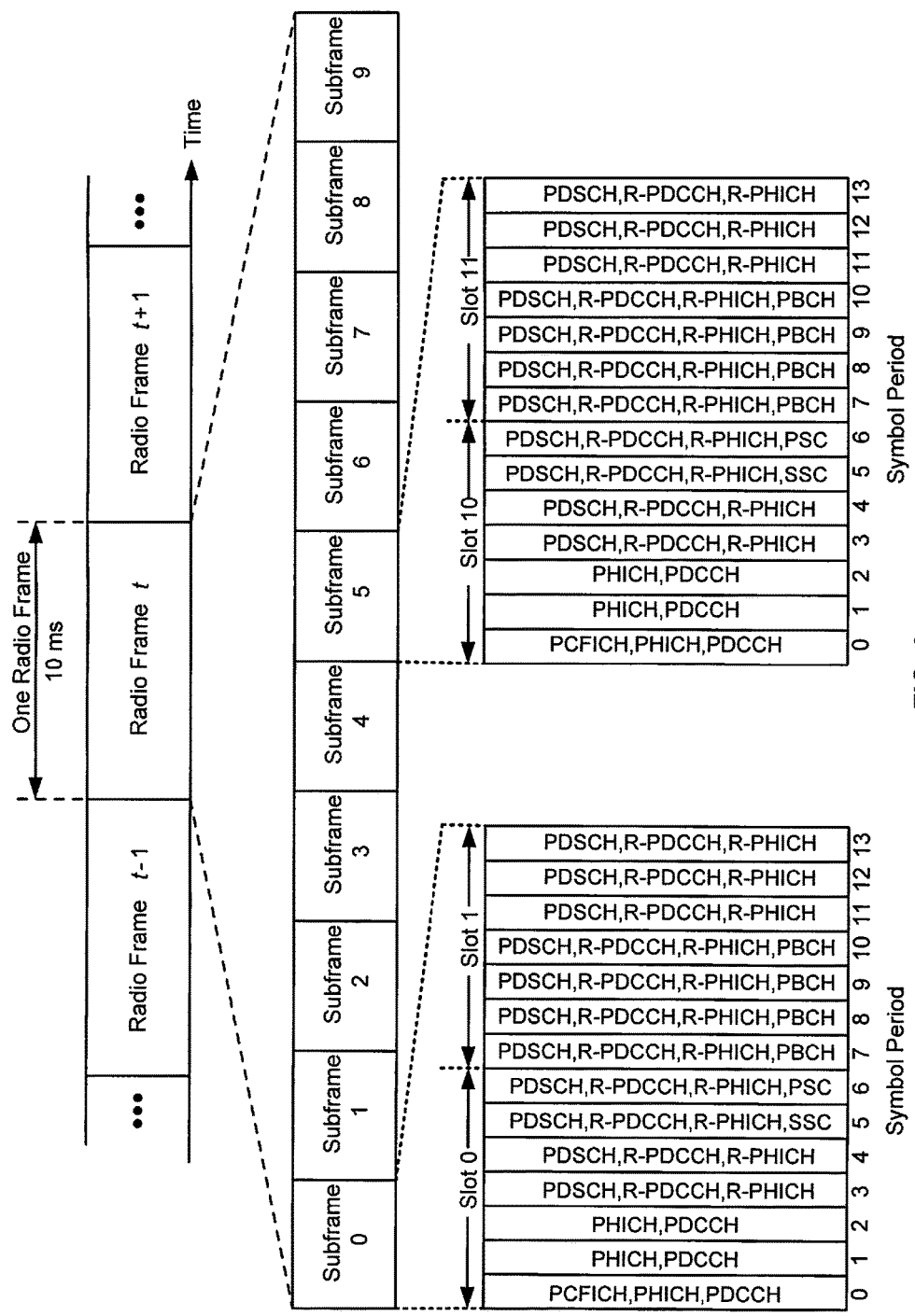
FIG. 2 is a block diagram illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2-L-1. The available time frequency resources may be partitioned into resource blocks. Each resource block may cover N subcarriers (e.g., 12 subcarriers) in one slot.

In LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, i.e., the first symbol period of each subframe, the LTE-A may also transmit these control-oriented channels in the data portions of each subframe as well. As shown in FIG. 2, these new control designs utilizing the data region, e.g., the Relay-Physical Downlink Control Channel (R-PDCCH) and Relay-Physical HARQ Indicator Channel (R-PHICH) are included in the later symbol periods of each subframe. The R-PDCCH is a new type of control channel utilizing the data region originally developed in the context of half-duplex relay operation. Different from legacy PDCCH and PHICH, which occupy the first several control symbols in one subframe, R-PDCCH and R-PHICH are mapped to resource elements (REs) originally designated as the data region. The new control channel may be in the form of Frequency Division Multiplexing (FDM), Time Division Multiplexing (TDM), or a combination of FDM and TDM.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
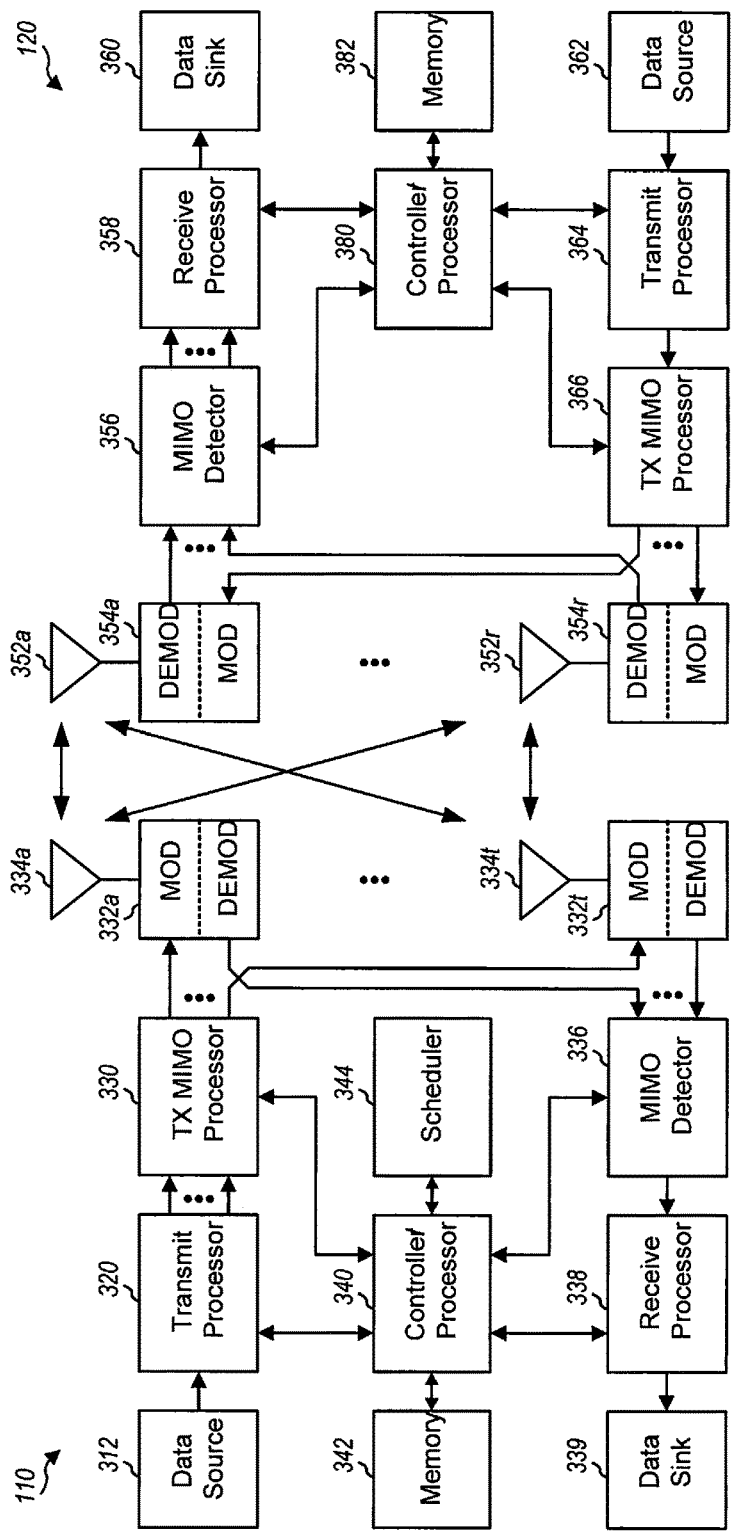
FIG. 3 is a block diagram illustrating a design of a base station/eNB and a UE configured according to one aspect of the present disclosure.

FIG. 3 is a block diagram illustrating an exemplary frame structure 300 in uplink long term evolution (LTE/-A) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNode B. The UE may transmit control information in a Physical Uplink Control Channel (PUCCH) on the assigned resource blocks 310*a* and 310*b* in the control section. The UE may transmit only data or both data and control information in a Physical Uplink Shared Channel (PUSCH) on the assigned resource blocks 320*a* and 320*b* in the data section. An uplink transmission may span both slots of a subframe and may hop across frequency as shown in FIG. 3.

Referring back to FIG. 1, the wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110*a-c* are usually carefully planned and placed by the provider of the wireless network 100. The macro eNBs 110*a-c* generally transmit at high power levels (e.g., 5 W-40 W). The pico eNB 110*x* and the relay station 110*r*, which generally transmit at substantially lower power levels (e.g., 100 mW-2 W), may be deployed in a relatively unplanned manner to eliminate coverage holes in the coverage area provided by the macro eNBs 110*a-c* and improve capacity in the hot spots. The femto eNBs 110*y-z*, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110*y-z* typically also transmit at substantially lower power levels (e.g., 100 mW-2 W) than the macro eNBs 110*a-c*.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110*x*, is characterized by a substantially lower transmit power when compared with a macro eNB, such as the macro eNBs 110*a-c*. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110*a-c* and the pico eNB 110*x* implies that, in a mixed deployment, the downlink coverage area of the pico eNB 110*x* will be much smaller than that of the macro eNBs 110*a-c*.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, the usefulness of mixed eNB deployment of heterogeneous networks, such as the wireless network 100, will be greatly diminished. This is because the larger coverage area of the higher powered macro eNBs, such as the macro eNBs 110*a-c*, limits the benefits of splitting the cell coverage with the pico eNBs, such as the pico eNB 110*x*, because, the higher downlink received signal strength of the macro eNBs 110*a-c* will attract all of the available UEs, while the pico eNB 110*x* may not be serving any UE because of its much weaker downlink transmission power. Moreover, the macro eNBs 110*a-c* will likely not have sufficient resources to efficiently serve those UEs. Therefore, the wireless network 100 will attempt to actively balance the load between the macro eNBs 110*a-c* and the pico eNB 110*x* by expanding the coverage area of the pico eNB 110*x*. This concept is referred to as cell range extension (CRE).

The wireless network 100 achieves CRE by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources between the macro eNBs 110*a-c* and the pico eNB

110*x*. However, even with this active balancing of load, downlink interference from the macro eNBs 110*a-c* should be mitigated for the UEs served by the pico eNBs, such as the pico eNB 110*x*. This can be accomplished by various methods, including interference cancellation at the UE, resource coordination among the eNBs 110, or the like.

In a heterogeneous network with cell range extension, such as the wireless network 100, in order for UEs to obtain service from the lower-powered eNBs, such as the pico eNB 110*x*, in the presence of the stronger downlink signals transmitted from the higher-powered eNBs, such as the macro eNBs 110*a-c*, the pico eNB 110*x* engages in control channel and data channel interference coordination with the dominant interfering ones of the macro eNBs 110*a-c*. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNB for use exclusively by the first eNB. Protected subframes may also be referred to as "clean" subframes based on the lack of interference from neighboring eNBs. Prohibited subframes are subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

At least one protected subframe is statically assigned per period. In some cases only one protected subframe is statically assigned. For example, if a period is 8 milliseconds, one protected subframe may be statically assigned to an eNB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

FIG. 4 is a block diagram illustrating time division multiplexed (TDM) partitioning in a heterogeneous network according to one aspect of the disclosure. A first row of blocks illustrates subframe assignments for a femto eNB, and a second row of blocks illustrate subframe assignments for a macro eNB. Each of the eNBs has a static protected subframe during which the other eNB has a static prohibited subframe. For example, the femto eNB has a protected subframe (U subframe) in subframe 0 corresponding to a prohibited subframe (N subframe) in subframe 0. Likewise, the macro eNB has a protected subframe (U subframe) in subframe 7 corresponding to a prohibited subframe (N subframe) in subframe 7. Subframes 1-6 are dynamically assigned as either protected subframes (AU), prohibited subframes (AN), and common subframes (AC). During the dynamically assigned common subframes (AC) in subframes 5 and 6, both the femto eNB and the macro eNB may transmit data.

Protected subframes (such as U/AU subframes) have reduced interference and a high channel quality because aggressor eNBs are prohibited from transmitting. Prohibited subframes (such as N/AN subframes) have no data transmission to allow victim eNBs to transmit data with low interference levels. Common subframes (such as C/AC subframes) have a channel quality dependent on the number of neighbor eNBs transmitting data. For example, if neighbor eNBs are transmitting data on the common subframes, the channel quality of the common subframes may be lower than the protected subframes. Channel quality on common subframes may also be lower for extended boundary area (EBA) UEs strongly affected by aggressor eNBs. An EBA UE may belong to a first eNB but also be located in the coverage area of a second eNB. For example, a UE communicating with a macro eNB that is near the range limit of a femto eNB coverage is an EBA UE.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities. This central entity may not always be practical or even desirable. Therefore, in alternative aspects a distributed algorithm may be used that makes resource usage decisions based on the channel information from a certain set of nodes. Thus, the slowly-adaptive interference algorithm may be deployed either using a central entity or by distributing the algorithm over various sets of nodes/entities in the network.

In deployments of heterogeneous networks, such as the wireless network 100, a UE may operate in a dominant interference scenario in which the UE may observe high interference from one or more interfering eNBs. A dominant interference scenario may occur due to restricted association. For example, in FIG. 1, the UE 120*y* may be close to the femto eNB 110*y* and may have high received power for the eNB 110*y*. However, the UE 120*y* may not be able to access the femto eNB 110*y* due to restricted association and may then connect to the macro eNB 110*c* (as shown in FIG. 1) or to the femto eNB 110*z* also with lower received power (not shown in FIG. 1). The UE 120y may then observe high interference from the femto eNB 110y on the downlink and may also cause high interference to the eNB 110y on the uplink. Using coordinated interference management, the eNB 110c and the femto eNB 110y may communicate over the backhaul 134 to negotiate resources. In the negotiation, the femto eNB 110y agrees to cease transmission on one of its channel resources, such that the UE 120y will not experience as much interference from the femto eNB 110y as it communicates with the eNB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNBs. The eNBs in a synchronous system are presumptively synchronized across the system. However, for example, considering a UE that is a distance of 5 km from the macro eNB, the propagation delay of any downlink signals received from that macro eNB would be delayed approximately 16.67 µs (5 km÷3×$10^8$, i.e., the speed of light, 'c'). Comparing that downlink signal from the macro eNB to the downlink signal from a much closer femto eNB, the timing difference could approach the level of a time-to-live (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

FIG. 3 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 334a through 334t, and the UE 120 may be equipped with antennas 352a through 352r.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the eNB 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by the demodulators 354a through 354r (e.g., for SC-FDM, etc.), and transmitted to the eNB 110. At the eNB 110, the uplink signals from the UE 120 may be received by the antennas 334, processed by the modulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the eNB 110 and the UE 120, respectively. The controller/processor 340 and/or other processors and modules at the eNB 110 may perform or direct the execution of various processes for the techniques described herein. The controllers/processor 380 and/or other processors and modules at the UE 120 may also perform or direct the execution of the functional blocks illustrated in FIGS. 6 and 7, and/or other processes for the techniques described herein. The memories 342 and 382 may store data and program codes for the eNB 110 and the UE 120, respectively. A scheduler 344 may schedule UEs for data transmission on the downlink and/or uplink.

In LTE, each node is equipped one or more transmit antennas, making it possible to support DL MIMO operation. Each node may have multiple sectors in which one or more transmit antennas are designated for each sector that also support DL MIMO operations in each sector. For common reference signal (CRS) based DL transmissions, the number of CRS antenna ports can be 1, 2, or 4. An antenna port is a logical representation of an antenna and may map to one or more physical antenna elements. For UE reference signal (UE-RS) based DL transmissions, the number of UE-RS antenna ports can be up to 8 in currently defined mobile standards and potentially more in future standards.

A UE provides channel state information (CSI) feedback to support DL MIMO operation. The UE takes measurements and makes determinations of various criteria, such as channel quality, rank indicators, precoding matrix information, and the like, and sends this information to the serving nodes. Based on this CSI feedback, the serving node makes transmission determinations. Channel and interference measurements for CSI feedback may be based on CRS or CSI-RS, depending on the configuration for the UE. A UE may also be configured with one or more CSI-RS processes. For example, in coordinated multipoint (CoMP) operations, the communication with the UE may be coordinated across multiple cells and nodes. Each CSI-RS process may be associated with a particular cell or node. Each CSI-Norton RS process may also be associated with a set of parameters, e.g., number of antenna ports for CSI feedback, periodicity for CSI-RS feedback, and the like.

Each node may have two or more carriers that may be assigned to different frequencies. The two or more carriers may be intra-band, inter-band, or a combination thereof. Additionally, different nodes may have carriers assigned to the same carrier frequency. Each such carrier may be equipped with a certain number of transmit antennas at their respective node or nodes. The node broadcasts the number of antennas for different reference signals, which may be different depending on the type of reference signal. For example, in a node with four physical transmit antennas, the node may broadcast two CRS ports and four CSI-RS ports. However, in some circumstances there may be an occasion to turn off, either partially or completely, some of the carriers. For example, for energy savings, if overall system load in a node is not high, it may be beneficial to turn off some carriers, depending on the type of node. In another example, to implement interference management, some carriers in some nodes may be turned off which may benefit surrounding nodes since inter-cell interference is reduced. Additionally, the nodes providing service for small cells may periodically or occasionally enter a dormancy mode. In order to manage such dormancy/activation periods in small cells, it may be beneficial to either partially or completely deactivate certain carriers where some nodes may be actively managed to be off/on, for operations such as mobility enhancements, interference coordination, and the like.

It should be noted that such operations may also be experienced between sectors of a single node. For example, it may be beneficial to deactivate certain carriers in a first sector to manage interference in the other sectors, especially when the system load in the first sector is low.

Considering the potential for certain carriers to be either completely or partially deactivated, and the fact that transmit antennas are specifically assigned for carrier transmissions, there may be circumstances in which certain transmit antennas assigned to deactivated carriers are idle while other transmit antennas assigned to active carriers are operating under a heavy load.

Figure 4A:
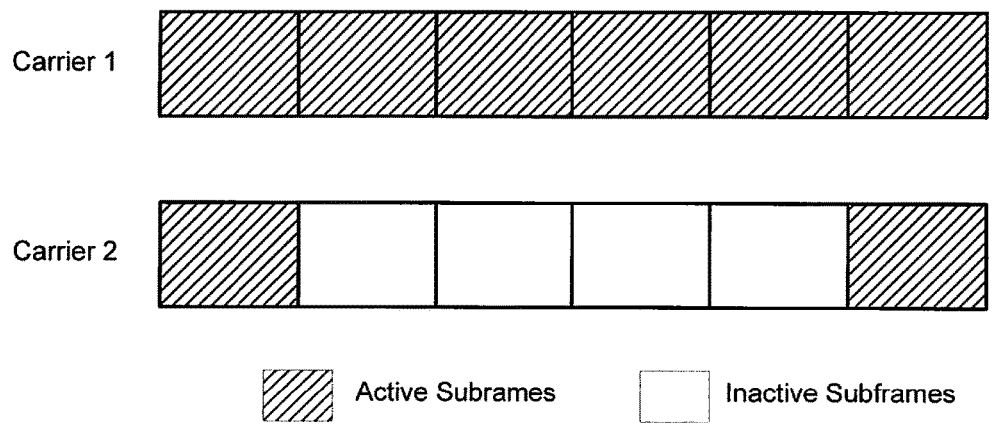
FIGS. 4A-4C are block diagrams illustrating transmission frames of two different carriers.

FIG. 4A is a block diagram illustrating transmission frames of two different carriers. In the illustrated example, Carrier 1 represents an LTE carrier, which may be a legacy carrier type (LCT) or a new carrier type (NCT), and Carrier 2 represents another LTE carrier of an NCT, where the NCT carrier of Carrier 2 is active once every 5 subframes. Thus, in the inactive subframes of Carrier 2, the transmit antennas assigned to Carrier 2 will be idle, while the transmit antennas of Carrier 1 remain active.

Figure 4B:
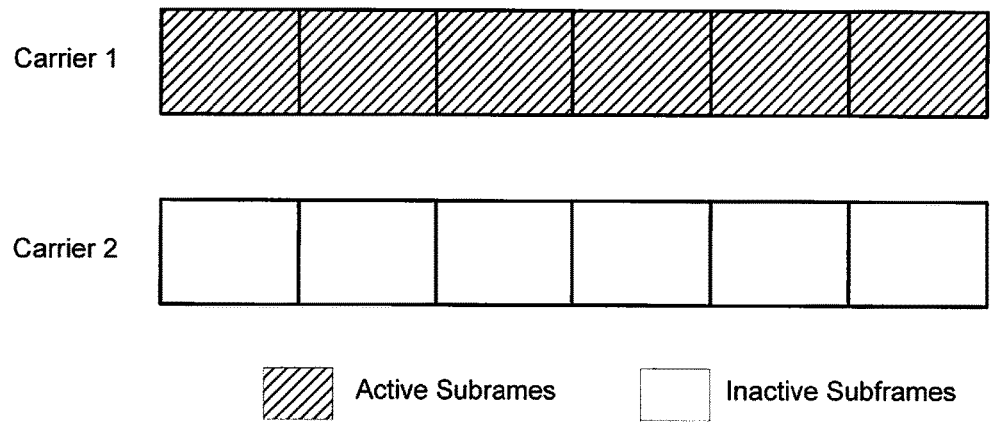

FIG. 4B is a block diagram illustrating transmission frames of two different carriers in which one of the two carriers remains inactive for certain durations. In this example, Carrier 1, once again, remains active throughout the transmission frame, while Carrier 2 is in an inactive period for the duration of the illustrated time. Here again, the transmit antennas assigned for Carrier 2 remain idle during the same period of time in which the transmit carriers assigned to Carrier 1 are active.

Figure 4C:
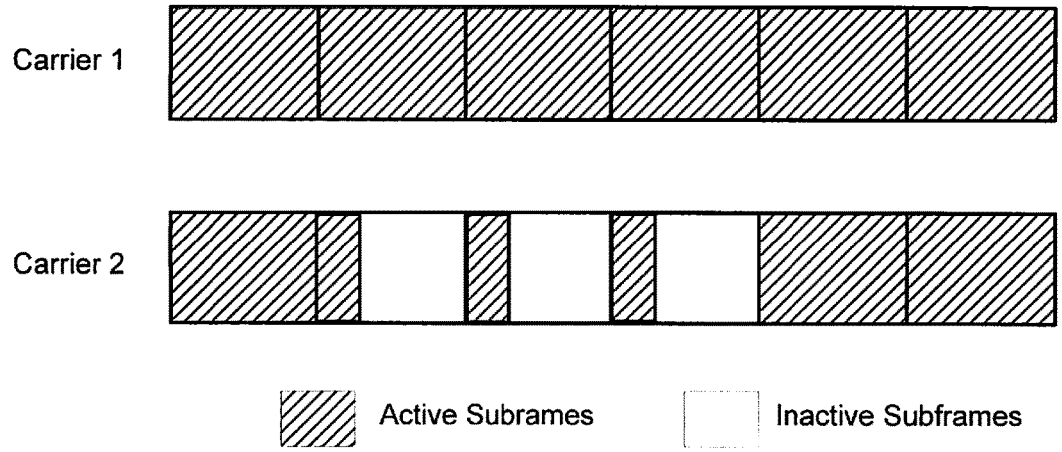

FIG. 4C is a block diagram illustrating transmission frames of two additional different carriers. In this example, Carrier 1, which represents an LCT, once again, remains active throughout the transmission frame, while Carrier 2, which also represents an LCT, operates in such a fashion where Carrier 2 is not active during a fraction of particular subframes. Such partial subframe activity may, in practice, occur in MBSFN regions of MBSFN subframes. Again, transmit antennas assigned to Carrier 2 will be inactive during periods in which the transmit antennas assigned to Carrier 1 are active. There should be no doubt that, during the inactivity of Carrier 2, in any of FIGS. 4A-4C, that the transmission efficiency of Carrier 1 may be increased by "borrowing" the idle transmit antennas that have been assigned to Carrier 2.

Various aspects of the present disclosure are related to borrowing transmit antennas from at least one first carrier for usage with a second carrier and transmitting various signals and reference signals using a set of antenna ports on the second carrier based on the combined physical antennas associated with the first carrier and physical antennas associated with the second carrier.

Figure 5A:
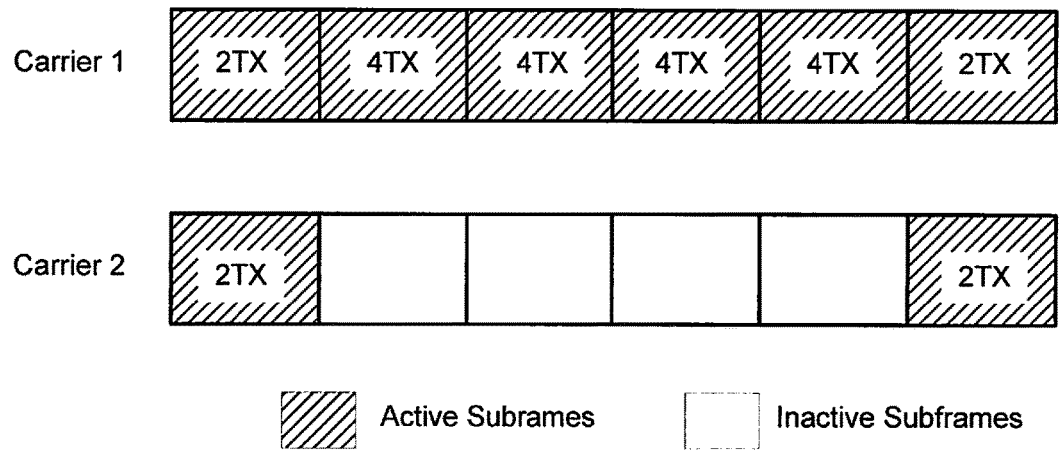
FIGS. 5A-5B are block diagrams illustrating transmission frames of two different carriers in wireless communication systems configured according to one aspect of the present disclosure.

FIG. 5A is a block diagram illustrating transmission frames of two different carriers in a wireless communication system configured according to one aspect of the present disclosure. Carriers 1 and 2 are each transmitted in a single node having multiple antennas. In the illustrated example, the transmitting node has four physical transmit antennas in which two of the transmit antennas are assigned to Carrier 1 and two of the transmit antennas are assigned to Carrier 2. In operation of the wireless communication system configured according to one aspect of the present disclosure, when both Carriers 1 and 2 are active, the node transmits using the assigned two transmit antennas for each of Carriers 1 and 2. However, when Carrier 2 is inactive, the node borrows the idle transmit antennas assigned to Carrier 2 for transmissions in Carrier 1. As such, during the inactive periods of Carrier 2, the node transmits Carrier 1 using four antenna ports—two transmit antennas assigned to Carrier 1 and two transmit antennas assigned to and borrowed from Carrier 2. Accordingly, the transmission efficiency of the node may be increased by utilizing the idle transmit antennas assigned to Carrier 2 for Carrier 1 transmissions.

Figure 5B:
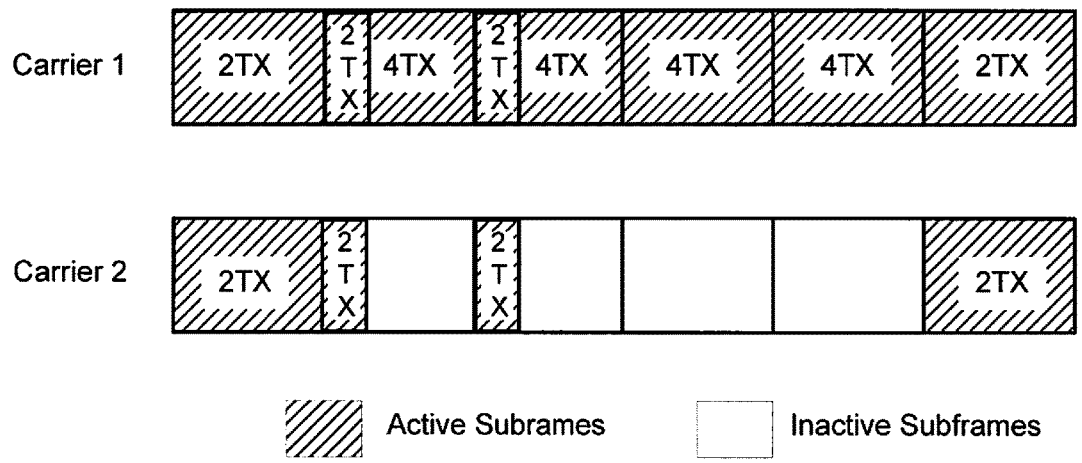

FIG. 5B is a block diagram illustrating transmission frames of two different carriers in another wireless communication system configured according to one aspect of the present disclosure. The various aspects of the present disclosure may also be applicable to implementations in which the second carrier is inactive for only portions of a particular subframe. As illustrated, Carrier 2 is active during the entire first and last illustrated subframes, but only a portion of the second and third illustrated subframes. While active, the node transmits on Carrier 2 using each of the assigned two transmit antennas. Correspondingly, while Carrier 2 is active and transmitting using two transmit antennas, Carrier 1 is also illustrated as active and will transmit using the two transmit antennas assigned to Carrier 1. However, when Carrier 2 is inactive, even during the remaining portions of the second and third illustrated subframes, the node borrows the two transmit antennas assigned to Carrier 2 and uses them in transmitting Carrier 1 with four transmit antennas. Thus, considering a node having r total transmit antennas with two transmit antennas assigned for a first carrier, when additional carriers of the node are inactive, the node may combine transmit antennas for transmission of Carrier 1, which can vary between two and r transmit antennas for the first carrier. When all carriers are active, the node uses the assigned transmit antennas for each carrier; however when one or more of the carriers is not active, the node may use the assigned transmit antennas for the active carrier plus any number of idle transmit antennas for the other inactive carriers.

With the increased number of transmit antennas, a carrier may perform better MIMO operations. For example, additional transmit antennas may allow for enhanced beamforming. Considering a node having N combined carriers in which two transmit antennas are assigned to each of the N carriers, a change from two transmit antennas to 2N transmit antennas where N-1 carriers are inactive at a time, a large beamforming gain is possible. Increased numbers of transmit antennas may also enhance multi-user MIMO (MU-MIMO) operation by creating an environment in which the node is more likely to perform MU-MIMO operation and achieve improved MU-MIMO performance with a greater number of transmit antennas. Increased numbers of transmit antennas may also enhance SU-MIMO operation by creating an environment in which a higher rank SU-MIMO operation is possible.

Figures 6, 7:
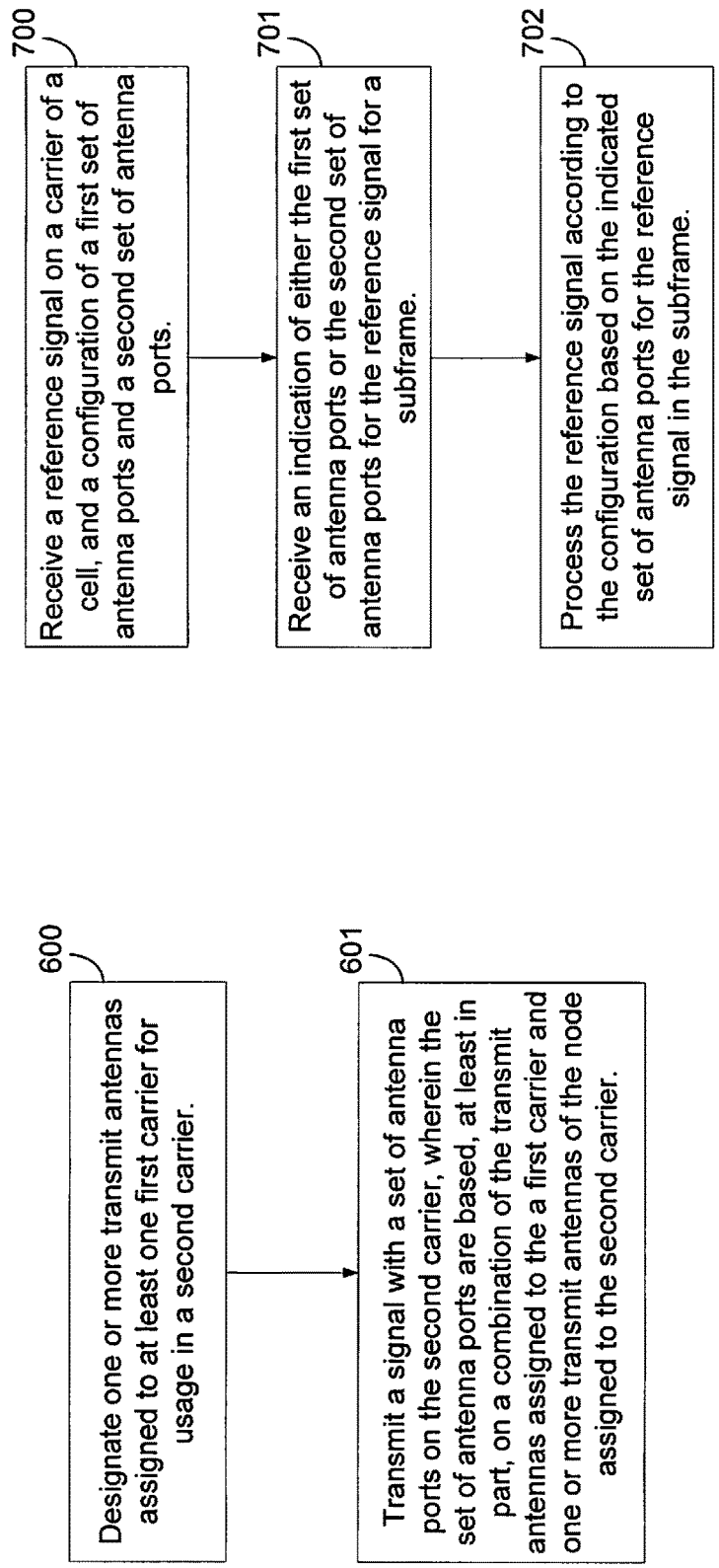
FIG. 6 is a functional block diagram illustrating example blocks executed to implement one aspect of the present disclosure.
FIG. 7 is a functional block diagram illustrating example blocks executed to implement one aspect of the present disclosure.

FIG. 6 is a functional block diagram illustrating example blocks executed to implement one aspect of the present disclosure. At block 600, a node designates one or more transmit antennas assigned to at least one first carrier for use in a second carrier. For example, a particular node may have six transmit antennas and use three carriers with two transmit antennas assigned for each of the three carriers. When a first carrier is inactive, the node may designate the two transmit antennas assigned to the first carrier for use in either the second or third carrier, such that the node may use four transmit carriers for the second or third carrier. When the first and second carriers are inactive, the node may designate the four transmit antennas assigned to the first and second carriers for use in the third carrier, such that the node may transmit using all six transmit carriers on the third carrier.

At block 601, the node transmits a signal with a set of antenna ports on the second carrier where this set of antenna ports is based, at least in part, on the combination of the transmit antennas assigned to the at least one first carrier and the one or more antennas assigned to the second carrier. This signal may be any number of different signals transmitted by a node, such as a control channel, a data channel, a reference signal (e.g., CRS, CSI-RS, UE-RS, demodulation reference signals (DM-RS), etc.) for at least one control channel or data channel, and the like. For example, as noted above, as any other carrier is inactive, the node may combine the transmit antennas assigned to the inactive carrier or carriers with the transmit antennas assigned to the active carrier for transmission of the various signals on the active, second carrier.

A node may transmit a reference signal to reflect the combination of transmit antennas to surrounding UEs, such as by using a CSI-RS. In a first CSI-RS configuration, a UE may be indicated a first number of antenna ports (reflecting no combined operation), and in a second CSI-RS configuration, a UE may be indicated a second number of antenna ports (reflecting combined operation). In certain configurations, there may be more than two possible CSI-RS configurations, for example, when there may be more than two combinations of transmit antennas across carriers (e.g., considering three carriers in one subframe, there may be three CSI-RS configurations (1) all carriers active and no combination; (2) only one carrier active with combination of transmit antennas from two inactive carriers; and (3) two carriers active with combination of transmit antennas from one inactive carrier. The different configurations can be in a same subframe or different subframes. In general, the second configuration (combination) is in a subframe when there is combined transmit across antennas, while the first configuration (no combination) can be in any subframes.

The different configurations can be indicated to a UE simultaneously or on an ad hoc basis one at a time. The indication of the configurations may depend on the timescale of the inactivity. If the inactivity is semi-static, there may be one configuration for an extended duration, followed by another configuration for an extended duration when there is a change in inactivity on at least one carrier. In such a semi-static operation, the CSI-RS configuration may be indicated one at a time, on an ad hoc basis depending on the particular operation. If the inactivity is dynamic, two configurations can be enabled simultaneously for a UE. Thus, the UE should have access to select either configuration depending on the current state of inactivity. Moreover, different UEs can be configured differently, both with different configurations and having either semi-static or dynamic indications of the configurations.

A UE may provide CSI feedback according to the various CSI-RS antenna configurations. Where, in the dynamic inactivity operation, two configurations are configured simultaneously, a UE may provide CSI feedback for two or more CSI processes, and the CSI feedback can be periodic, aperiodic or a combination of both. The node will schedule the UE based on this CSI feedback and the transmit antenna availability accordingly.

FIG. 7 is a functional block diagram illustrating example blocks executed to implement one aspect of the present disclosure. At block 700, a UE receives a reference signal on a carrier and a configuration of multiple sets of antenna ports from a serving node. UEs routinely receive references signals from various serving and non-serving nodes. UEs utilize such reference signals to determine handover, analyze interference, perform measurements, and provide feedback to serving nodes. In the described aspect, the UE also receives antenna configurations that may indicate to the UE a number of transmit antennas or antenna ports that will be used by the serving node to transmit various signals, including reference signals.

At block 701, the UE receives a dynamic indication of which of the configurations of the sets of antenna ports the node used for the reference signal received for a subframe. For example, the UE receives an indication of which CSI-RS configuration to select based on the number of transmit antennas used by the node in transmitting the reference signal for a subframe. The indication may also be received by the UE through downlink control information (DCI) transmitted from the serving node, or through various activation or deactivation messages from the serving node. The indication may be semi-static, dynamic, or a combination of both semi-static and dynamic. As an example, a UE may be configured with two or more CSI-RS configurations. Additionally, a UE may receive an activation of some of the two or more CSI-RS configurations.

At block 702, the UE selects the indicated configuration for the particular set of antenna ports and processes the reference signal based on the indicated set of antenna ports. For example, after the UE receives the indication of which configuration to select, the UE selects to implement that transmit antenna configuration and processes the reference signal according to the selected antenna configuration.

As noted, the management of transmit antennas across carriers can be semi-static or dynamic. In an active (dynamic) transmit antenna management, there may be occasions in which there is a conflicting need regarding whether transmit antennas associated with a first carrier should be used for the first carrier or a second carrier at a given time.

Figure 8:
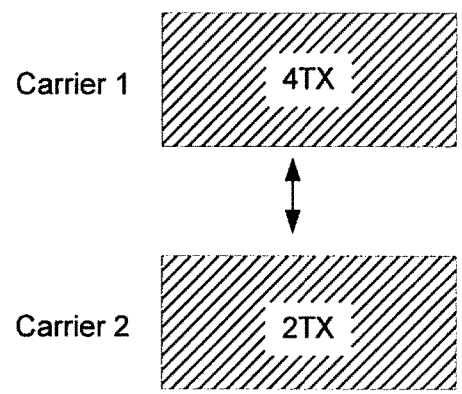
FIG. 8 is a block diagram illustrating a single subframe of two carriers in a wireless communication system configured according to one aspect of the present disclosure.

FIG. 8 is a block diagram illustrating a single subframe of two carriers in a wireless communication system configured according to one aspect of the present disclosure. The node transmitting Carriers 1 and 2 includes four transmit antennas. As illustrated, during the indicated subframe, the node shows that Carrier 1 is indicated to transmit using four transmit antennas while Carrier 2 is indicated to transmit using two transmit antennas. For example, Carrier 1 is scheduled to transmit a CSI-RS with four transmit ports (combined transmit antennas across the two carriers), while Carrier 2 determines to be active in the same subframe.

In order to resolve the conflict in the number of scheduled transmit antennas, the node may operate under several different alternatives. For example, in a first possible resolution, the node may force Carrier 2 to become inactive during the illustrated subframe. By forcing this inactivity in Carrier 2, the node may use four transmit antenna ports for transmitting CSI-RS on Carrier 1. In another example operation, the node may either completely omit CSI-RS on the conflicting subframe or use only the two transmit antenna ports assigned to Carrier 1 for transmitting CSI-RS in the subframe. In another example operation to resolve such a conflict, the node may transmit the CSI-RS using a time division multiplex (TDM) operation within the conflicting subframe, such that, on Carrier 1, four transmit antenna ports are used to transmit CSI-RS in the symbols carrying CSI-RS, while two transmit antennas are used in other symbols for Carrier 1. Consequently, the node will not transmit on Carrier 2 during those symbols carrying CSI-RS in Carrier 1, and will transmit on Carrier 2 using two transmit antennas during the other symbols of the subframe.

In another example, the node may transmit both Carrier 1 with four antenna ports and Carrier 2 with two antenna ports in a same subframe. However, in order to address the issue that Carrier 1 only has two physical antennas but indicates transmission by four antenna ports, the node can logically map the two physical antennas to the four antenna ports. By doing so, transparent operation from the UE perspective can be realized. That is, no specific handling is necessary for a UE to handle the conflicting scenarios. Because two or more physical antenna ports are mapped to a same antenna port, there may be degraded performance associated with the corresponding reference signal, e.g., for CSI-RS-based channel feedback. However, such degraded performance can be handled by the node, since the node knows the actual mapping between the physical antennas and the indicated antenna ports.

It should be noted that the management of transmit antennas across carriers is not limited to LTE on licensed spectrum. Various aspects of the present disclosure may be applied to LTE communication operations on unlicensed spectrum, or WIFI communication on unlicensed spectrum (e.g., for carrier sense multiple access (CSMA)-based multiplexing), or a combination of both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 6 and 7 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. A computer-readable storage medium may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, non-transitory connections may properly be included within the definition of computer-readable medium. For example, if the instructions are transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising: designating, by a node, one or more transmit antennas of the node assigned to at least one first carrier for use with a second carrier, wherein the designating the one or more transmit antennas for use with the second carrier includes borrowing the one or more transmit antennas from the at least one first carrier based on the one or more transmit antennas being idle when the at least one first carrier is one of: partially or completely deactivated;
   transmitting, by the node, to one or more mobile devices at least one of a control channel, a data channel, or a reference signal using a set of antenna ports on the second carrier, wherein the set of antenna ports on the second carrier is based, at least in part, on a combination of the one or more transmit antennas borrowed from the at least one first carrier and one or more transmit antennas of the node assigned for use with the second carrier; and
   transmitting a signal to the one or more mobile devices indicating an antenna port configuration that was used in the transmitting the at least one of the control channel, the data channel, or the reference signal, and indicating a number of antenna ports in the set of antenna ports on the second carrier based, at least in part, on the combination of the one or more transmit antennas and the one or more transmit antennas of the node assigned for use with the second carrier, wherein the number of antenna ports indicated by the signal facilitates processing the at least one of the control channel, the data channel, or the reference signal at the one or more mobile devices, and wherein the antenna port configuration is part of one or more channel state information reference signal (CSI-RS) configurations.

2. The method of claim 1, wherein the at least one first carrier and the second carrier are of a different carrier frequency, and the at least one first carrier and the second carrier are associated with a same cell of the node.

3. The method of claim 1, wherein the at least one first carrier and the second carrier are of a same carrier frequency, and the at least one first carrier is associated with a first cell and the second carrier is associated with a second cell, where the first cell and the second cell are different and of a same cell of the node.

4. The method of claim 1, wherein the deactivation of the at least one first carrier is for one of:
   one or more subframes; or
   a fraction of a subframe.

5. The method of claim 1,
   wherein a first of the one or more CSI-RS configurations is associated with one of:
   a first subframe;
   subframes over a first duration; and
   wherein a second of the one or more CSI-RS configurations is associated with one of:
   a second subframe; and
   subsequent subframes after the first duration.

6. The method of claim 1, further comprising:
   transmitting a demodulation reference signal (DM-RS) for at least one of a control channel or a data channel to one or more mobile devices, wherein the DM-RS are based on the combination of the one or more transmit antennas.

7. The method of claim 1, further comprising:
   reactivating the at least one first carrier; and
   designating the one or more transmit antennas of the node for use with the reactivated at least one first carrier.

8. The method of claim 7, further comprising transmitting one or more other antenna port configurations based on the designating the one or more transmit antennas for use with the reactivated at least one first carrier.

9. An apparatus configured for wireless communication, comprising: means for designating, by a node, one or more transmit antennas of the node assigned to at least one first carrier for use with a second carrier, wherein the means for designating the one or more transmit antennas for use with the second carrier includes means for borrowing the one or more transmit antennas from the at least one first carrier based on the one or more transmit antennas being idle when the at least one first carrier is one of: partially or completely deactivated;
   means for transmitting, by the node, to one or more mobile devices at least one of a control channel, a data channel, or a reference signal using a set of antenna ports on the second carrier, wherein the set of antenna ports on the second carrier is based, at least in part, on a combination of the one or more transmit antennas borrowed from the at least one first carrier and one or more transmit antennas of the node assigned for use with the second carrier; and
   means for transmitting a signal to the one or more mobile devices indicating an antenna port configuration that was used by the means for transmitting the at least one of the control channel, the data channel, or the reference signal, and indicating a number of antenna ports in the set of antenna ports on the second carrier based, at least in part, on the combination of the one or more transmit antennas and the one or more transmit antennas of the node assigned for use with the second carrier, wherein the number of antenna ports indicated by the signal facilitates processing the at least one of the control channel, the data channel, or the reference signal at the one or more mobile devices, and wherein the antenna port configuration is part of one or more channel state information reference signal (CSI-RS) configurations.

10. The apparatus of claim 9, wherein the at least one first carrier and the second carrier are of a different carrier frequency, and the at least one first carrier and the second carrier are associated with a same cell of the node.

11. The apparatus of claim 9, wherein the at least one first carrier and the second carrier are of a same carrier frequency, and the at least one first carrier is associated with a first cell and the second carrier is associated with a second cell, where the first cell and the second cell are different and of a same cell of the node.

12. The apparatus of claim 9, wherein the deactivation is for one of:
one or more subframes; or
a fraction of a subframe.

13. The apparatus of claim 9,
wherein a first of the one or more CSI-RS configurations is associated with one of:
a first subframe;
subframes over a first duration; and
wherein a second of the one or more CSI-RS configurations is associated with one of:
a second subframe; and
subsequent subframes after the first duration.

14. The apparatus of claim 9, further comprising:
means for transmitting a demodulation reference signal (DM-RS) for at least one of a control channel or a data channel to one or more mobile devices, wherein the DM-RS are based on the combination of the one or more transmit antennas.

15. The apparatus of claim 9, further comprising:
means for reactivating the at least one first carrier; and
means for designating the one or more transmit antennas of the node for use with the reactivated at least one first carrier.

16. The apparatus of claim 15, further comprising means for transmitting one or more other antenna port configurations based on the designating the one or more transmit antennas for use with the reactivated at least one first carrier.

17. A computer program product for wireless communications in a wireless network, comprising:
a non-transitory computer-readable medium having program code recorded thereon, the program code including:
program code for causing a computer to designate, by a node, one or more transmit antennas of the node assigned to at least one first carrier for use with a second carrier, wherein the program code for causing a computer to designate the one or more transmit antennas for use with the second carrier includes program code for causing a computer to borrow the one or more transmit antennas from the at least one first carrier based on the one or more transmit antennas being idle when the at least one first carrier is one of: partially or completely deactivated;
program code for causing the computer to transmit, by the node, to one or more mobile devices at least one of a control channel, a data channel, or a reference signal using a set of antenna ports on the second carrier, wherein the set of antenna ports on the second carrier is based, at least in part, on a combination of the one or more transmit antennas borrowed from the at least one first carrier and one or more transmit antennas of the node assigned for use with the second carrier; and
program code for causing the computer to transmit a signal to the one or more mobile devices indicating an antenna port configuration that was used in the transmission of the at least one of the control channel, the data channel, or the reference signal, and indicating a number of antenna ports in the set of antenna ports on the second carrier based, at least in part, on the combination of the one or more transmit antennas and the one or more transmit antennas of the node assigned for use with the second carrier, wherein the number of antenna ports indicated by the signal facilitates processing the at least one of the control channel, the data channel, or the reference signal at the one or more mobile devices, and wherein the antenna port configuration is part of one or more channel state information reference signal (CSI-RS) configurations.

18. The computer program product of claim 17, wherein the at least one first carrier and the second carrier are of a different carrier frequency, and the at least one first carrier and the second carrier are associated with a same cell of the node.

19. The computer program product of claim 17, wherein the at least one first carrier and the second carrier are of a same carrier frequency, and the at least one first carrier is associated with a first cell and the second carrier is associated with a second cell, where the first cell and the second cell are different and of a same cell of the node.

20. The computer program product of claim 17, further comprising:
program code for causing the computer to transmit a demodulation reference signal (DM-RS) for at least one of a control channel or a data channel to one or more mobile devices, wherein the DM-RS are based on the combination of the one or more transmit antennas.

21. The computer program product of claim 17, further comprising:
program code for reactivating the at least one first carrier; and
program code for designating the one or more transmit antennas of the node for use with the reactivated at least one first carrier.

22. The computer program product of claim 21, further comprising program code for transmitting one or more other antenna port configurations based on the designating the one or more transmit antennas for use with the reactivated at least one first carrier.

23. An apparatus configured for wireless communication, the apparatus comprising:
at least one processor; and
a memory coupled to the at least one processor,
wherein the at least one processor is configured:
to designate, by a node, one or more transmit antennas of the node assigned to at least one first carrier for use with a second carrier, wherein the configuration of the at least one processor to designate the one or more transmit antennas for use with the second carrier includes borrowing the one or more transmit antennas from the at least one first carrier based on the one or more transmit antennas being idle when the at least one first carrier is one of: partially or completely deactivated; and to transmit, by the node, to one or more mobile devices at least one of a control channel, a data channel, or a reference signal using a set of antenna ports on the second carrier, wherein the set of antenna ports on the second carrier is based, at least in part, on a combination of the one or more transmit antennas borrowed from the at least one first carrier and one or more transmit antennas of the node assigned for use with the second carrier; and to transmit a signal to the one or more mobile devices indicating an antenna port configuration that was used in the transmission of the at least one of the control channel, the data channel, or the reference signal, and indicating a number of antenna ports in the set of antenna ports on the second carrier based, at least in part, on the combination of the one or more transmit antennas and the one or more transmit antennas of the node assigned for use with the second carrier, wherein the number of antenna ports indicated by the signal facilitates processing the at least one of the control channel, the data channel, or the reference signal at the one or more mobile devices, and wherein the antenna port configuration is part of one or more channel state information reference signal (CSI-RS) configurations.

24. The apparatus of claim 23, wherein the at least one first carrier and the second carrier are of a different carrier frequency, and the at least one first carrier and the second carrier are associated with a same cell of the node.

25. The apparatus of claim 23, wherein the at least one first carrier and the second carrier are of a same carrier frequency, and the at least one first carrier is associated with a first cell and the second carrier is associated with a second cell, where the first cell and the second cell are different and of a same cell of the node.

26. The apparatus of claim 23, further comprising configuration of the at least one processor to transmit a demodulation reference signal (DM-RS) for at least one of a control channel or a data channel to one or more mobile devices, wherein the DM-RS are based on the combination of the one or more transmit antennas.

27. The apparatus of claim 23, wherein the at least one processor is further configured:

to designate, when the at least one first carrier is reactivated, the one or more transmit antennas of the node for use with the reactivated at least one first carrier.

28. The apparatus of claim 27, further comprising configuration of the at least one processor to one or more other antenna port configurations based on the designating the one or more transmit antennas for use with the reactivated at least one first carrier.

* * * * *